United States Patent
Garrett, Jr. et al.

(10) Patent No.: US 6,824,389 B1
(45) Date of Patent: Nov. 30, 2004

(54) POST MORTEM RECONSTITUTION OF CIRCULATION

(75) Inventors: H. Edward Garrett, Jr., Memphis, TN (US); Robert D. G. Ferguson, Lewisville, NC (US); J. Scott Williams, Cordova, TN (US)

(73) Assignee: Medical Education & Research Institute, Memphis, TN (US)

( * ) Notice: Subject to any disclaimer, the term of this patent is extended or adjusted under 35 U.S.C. 154(b) by 0 days.

(21) Appl. No.: 09/518,127

(22) Filed: Mar. 3, 2000

Related U.S. Application Data

(60) Provisional application No. 60/122,851, filed on Mar. 4, 1999.

(51) Int. Cl.[7] .............................................. G09B 23/28
(52) U.S. Cl. ......................... 434/262; 604/247; 604/30; 604/4.1
(58) Field of Search ..................... 434/262; 604/93.01, 604/173, 181, 215, 246, 540, 167.02, 247

(56) References Cited

U.S. PATENT DOCUMENTS

| | | | |
|---|---|---|---|
| 4,982,481 A | * 1/1991 | Deutscher | .................. 27/21.1 |
| 5,178,620 A | * 1/1993 | Eggers et al. | .................. 606/41 |
| 5,574,019 A | * 11/1996 | Segall et al. | .................... 435/2 |
| 5,607,411 A | * 3/1997 | Heironimus et al. | ........ 137/205 |
| 6,110,139 A | * 8/2000 | Loubser | ........................ 604/30 |
| 6,218,099 B1 | * 4/2001 | Segall et al. | .................. 435/1.2 |
| 6,371,942 B1 | * 4/2002 | Schwartz et al. | ........... 137/606 |

* cited by examiner

Primary Examiner—Joe H. Cheng
Assistant Examiner—John Sotomayor
(74) Attorney, Agent, or Firm—Wyatt, Tarrant & Combs, LLP

(57) ABSTRACT

A method of selectively perfusing a non-preserved, non-heart beating cadaver with a perfusate to recreate vascular circulation in a cadaver as a mechanism for study of the vascular function, research and teaching of surgical procedures and general medical training. The arteries or veins of the cadaver are exposed, dissected, and flushed to remove clots and excess blood. A selected arterial tree of the cadaver is perfused with a solution via inflow through a point of access and outflow through at least one point of egress. The points of access and egress establish the limits of the circuit to be studied or used for testing.

20 Claims, 4 Drawing Sheets

POST MORTEM RECONSTITUTION OF CIRCULATION

CROSS-REFERENCE TO RELATED APPLICATIONS

This application relates to and Applicants claim the benefit of priority of Provisional Application Ser. No. 60/122,851, filed Mar. 4, 1999.

STATEMENT REGARDING FEDERALLY SPONSORED RESEARCH

Not applicable.

BACKGROUND OF THE INVENTION

1. Field of the Invention

This invention relates to the reconstitution of vascular circulation in a cadaver as a mechanism for study of the vascular function, research and teaching of surgical procedures and general medical training. In addition, this invention aids in the development and evaluation of new medical devices using techniques for reconstituting the vascular flow of a fluid simulating blood in a fresh (as opposed to an embalmed) cadaver.

2. Description of the Related Art

Training physicians and other medical care personnel and surgical associates for performing specific surgeries requires an appropriate model system. It is highly desirable for medical trainees to be able to practice and hone their skills on a model system, rather than on a live person in need of a particular treatment. Similarly, both the development of and new medical devices benefit from testing on a model system. Verification of physical and operating parameters of the device, development of surgical procedures for implantation of the device and training of medical care personnel to learn how to place and use these devices in a body are materially improved if there is a close model of the in vivo human system available for these activities. Indeed, there is the potential for a great deal of harm to a patient if the physician has not had the appropriate training or a particular device has not been appropriately evaluated and its performance characteristics verified. This is especially true for physicians and devices related to the endovascular system.

As the field of endovascular intervention steadily increases, there is an increasing need to train physicians and other surgical associates to perform new surgical techniques and to use new interventive devices. The new surgical techniques and new devices require training and practice on the part of the physicians and other surgical associates. In fact, the process of development of such new devices themselves is enhanced and facilitated with the ability to place prototypes into an "in vivo" environment, first to refine the physical parameters of the device and then to predict efficacy and utility before they are used on a live patient. All of these needs require an appropriate model system for replicating the implantation and device function prior to the implantation in a human.

To date, the only models available for this purpose involve either plastic models perfused with water and built to imitate the human vascular tree, or live animal models. For example, U.S. Pat. No. 5,632,623 discloses a mock circulation system having a plurality of channels formed within a housing to represent the arteries, veins and organs of a human circulatory system. The U.S. Pat. No. 5,632,623 system uses an artificial ventricle such as the type which are implanted in experimental animals including humans. Unfortunately, plastic models like the U.S. Pat. No. 5,632,623 model, do not have the same feel as human tissues or the same strength. Thus, testing devices on plastic model systems often does not recreate the situations found in human beings.

Animal models also have significant disadvantages. A major disadvantage is that the animals often differ significantly from humans in terms of their vascular anatomy as well as in the size of their vessels. Thus, training and testing on animal systems does not closely simulate the situations a medical associate or a medical device would encounter in a human body.

Life-like human models are more appropriate than plastic or animal models for practice and training purposes and could also accelerate the testing of new devices. While various systems using fresh human cadavers have been described previously, these systems are designed to embalm a body, not to reestablish circulation in isolated and discrete circuits of the body. For example, U.S. Pat. Nos. 2,369,694, 2,388,337, 2,401,849 and 2,462,617 all describe methods and pumps for preparing a cadaver for a burial which includes forcing the liquid embalming fluid into a body. They do not establish any type of circulation throughout the body, and in particular they do not isolate or re-establish any specific circulatory circuit.

Other systems for use on human organs are designed to preserve the human organs for eventual transplantation. For example, U.S. Pat. No. 5,066,578 describes the perfusion of human organs such as liver, kidney, pancreas, spleen, brain, embryo, testicles, ovaries, lung or heart-lung complex with a specific physiological preservation solution. Unlike the instant invention, this method involves the practice of isolating and perfusing organs separate and away from the natural circulatory environment of the human body. Such approach specifically does not use the human body's own circulatory circuits for reconstituting or emulating circulation. U.S. Pat. No. 4,666,425 (reexamination certificate issued Feb. 25, 1992 in which all 20 claims were canceled) describes the use of a device to supply a discorped head with oxygenated blood and nutrients. Similar to the U.S. Pat. No. 5,066,578 patent, the methods described in the U.S. Pat. No. 4,666,425 patent distinctly do not use the human body's own circulatory circuits to maintain the circulation.

SUMMARY OF THE INVENTION

The inventive method provides a model system which can be used to isolate specific naturally occurring vascular circuits for both teaching and device development and evaluation purposes. The method has been designed to overcome the prior art problems of the plastic and non-human animal models by reconstituting circulation in the major vessels of a fresh, non-embalmed, non-heart-beating human cadaver.

Fresh, frozen cadavers are readily available for scientific investigation. By reconstituting, or simulating, the normal circulation patterns on these fresh cadavers, medical care personnel can develop, evaluate and practice specific endovascular procedures, as well as facilitate development and evaluation of various endovascular devices. Using actual human bodies offers the significant advantage of allowing the practitioner/trainee to operate on a model having the actual size and placement of the human vessels, as well as provide the realism that a plastic model necessarily lacks. Since actual human anatomy is used, this system provides a life-like training and testing situation.

The system of the instant invention provides at least a three-fold benefit: 1) a superior model system for research and development of new intra-operative techniques, 2) acceleration of the development of medical devices, particularly those which meet the United States Food and Drug Administration (FDA) guidelines, and 3) a powerful teaching tool so as to accelerate the learning curve of physicians and other surgical associates. Additionally, the inventive system further advances the knowledge, understanding and techniques associated with reconstituting circulation in a cadaver. This can lead to new methodologies in device research, including vascular stents, aortic devices, catheter and other vascular based interventional studies.

DETAILED DESCRIPTION OF INVENTION

Figure 1:
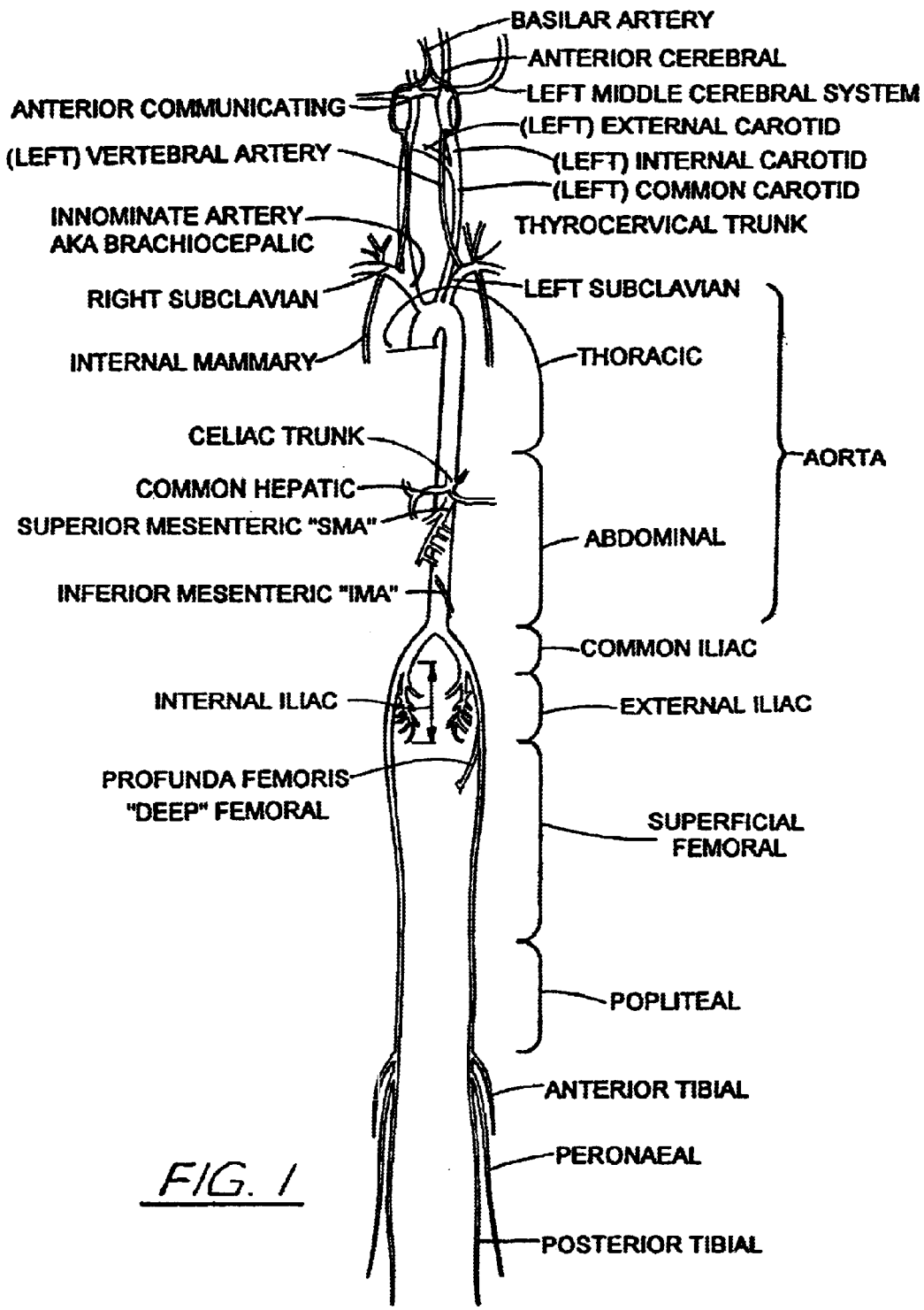
FIG. 1 is a schematic view of the right carotid circuit of the human vascular system.

The methodology of this invention involves the use of a whole fresh human cadaver. The cadaver is preferably fresh, frozen, non-heart beating and non-embalmed. The method of re-establishing or reconstituting vascular circulation in the cadaver shows great promise for medical teaching, surgeon training (both in surgical technique as well as device placement) and in device development and evaluation. Particularly, because the tissue of the fresh cadaver involved simulates that of the live human, training surgeons in the placement of such as catheters, stents and stented grafts is particularly effective.

In the procedure of the instant invention, generally the cadaver will have the thrombi removed from the major vessels through the use of a purging solution, such as Permico® solution available from the Dodge Co. In conjunction with cleaning out thrombi, it is preferable to add known agents which prolong the natural characteristics of the tissue of the cadaver to as closely to those when the cadaver was alive. The closer that the vascular tissue integrity and elasticity can be held to its original character, the better will the reconstituted system provide "in vivo" approximation. Thus, it is useful to add stabilizers which preserve vessel integrity including such as glycerol and aloe extract. Further, gentle preservatives such as dilute formulations of alcohol are advantageous. Finally, the addition of dilute amounts of one or more of antimicrobial drugs will further preserve the useful life of the model. An incision is made in as many arteries as necessary, and a chemical compound used for dissolving clots in cadaver arteries is infused into the arterial tree. Usually, several arterial sites are accessed by direct incision and the arteries are exposed surgically. Which particular arteries to be exposed will depend on which circuit is to be isolated and reestablished. For example, when isolating the aortic circuit, both carotid arteries and both femoral arteries are exposed. When isolating the head and neck or upper extremity circuit, both of the axillary arteries are exposed. Once the arterial tree has been adequately cleared of all thrombi, it is prepared for use depending on which portion of the arterial tree is scheduled for investigation. In this respect "adequately cleaned" means the cleaning out of inclusions such as blood clots so as to enable a fluid flow in the selected circuit which emulates a reconstituted circulation of human blood in the circuit.

In the establishment of a circuit to be studied, endovascular occlusion points are established at the limits of the circuit to be studied. This is accomplished by one of a variety of means. One preferred embodiment is by means of a balloon catheter, which, when inflated, occludes the vein or artery but allows access by the surgeon through a selectively openable lumen of the catheter. It is our preference to utilize a large bore occluding balloon catheter, such as the Meditek OB (non-tapered) catheter available from Boston Scientific Company. For example, when reconstituting circulation through the abdominal aortic circuit, access is established by placing the balloon catheter into the descending thoracic aorta (see, FIG. 3). Points of egress are established by selectively occluding appropriate vessels. For example, in the abdominal aortic circuit, incisions in the left and right carotid arteries used for flushing are subsequently occluded, while the incisions in the left and right femoral arteries are left open. The incisions in the left and right femoral arteries in this case can be cannulated for convenience to allow better control of the fluid emerging from these vessels.

The cadaver is preferably manually infused with a perfusate, or preferably hooked to pump for the purpose of reconstituting circulation within the major vessels. Generally, the rotary head pump of a heart-lung perfusion machine is used. However, any pump capable of establishing circulation through various bodily access and egress points can be used. For example, when isolating the abdominal aortic circuit, the pump is connected to a point of access through the descending thoracic aorta, and to points of egress through the femoral vessels.

The abdominal aortic circuit is not the only circuit that can be isolated and utilized for the study of devices or procedures using the inventive reconstitution of circulation system. Examples of other circuits that can be studied using this system include, but are not limited to, the circulation within the major vessels of the intercostal cavity, the coronary vessels, the carotid vessels (see FIG. 2), the central thoracic system (see, FIG. 3), and an extremity such as an arm, or a leg (see, FIG. 4). Particular legs of each of these circuits can be individually selected using the method of the present invention. Particularly, the axial, brachial, iliac, femoral, popiteal and pulminary arteries, the vertebral, basilar, renal and mesenteric vessels are already of interest. Others may be isolated and investigated as dictated by devices or procedures of interest.

Figure 2:
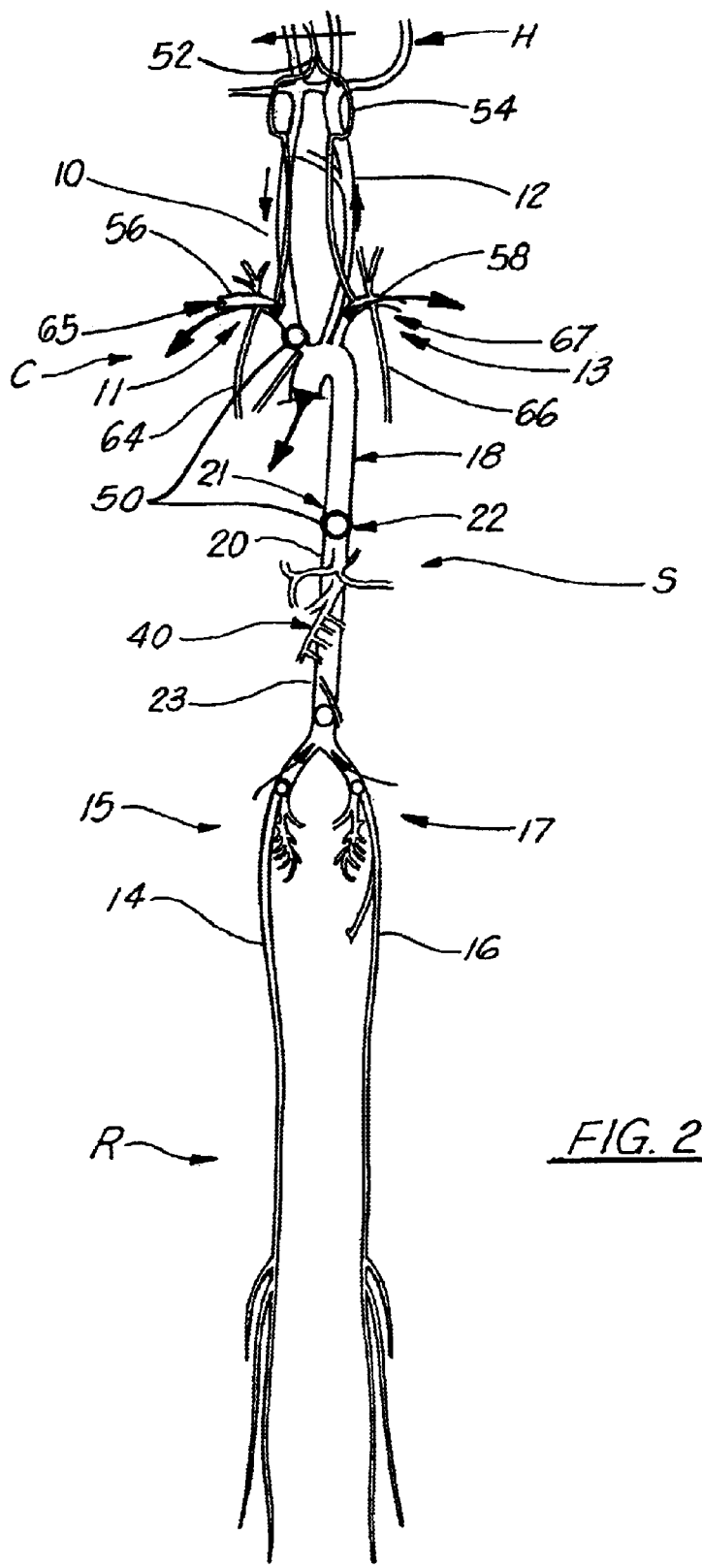
FIG. 2 is a schematic view of a the carotid circuit and the aorta circuit of the human vascular system illustrating two embodiments of the inventive system.

In the case of the left carotid circuit, left and right femoral arteries are occluded in the iliac region (see FIG. 2). One of the arteries is selected for the ingress of fluid from the heart-lung machine and the other is selected as the ingress for the surgical access. Depending upon the extent of the circuit to be examined, the upper occlusion may be at one or more of several sites. Frequently, occlusion and access or egress points are selected in the right and left subclavian arteries adjacent the upper aorta. As can be seen in FIG. 2, a balloon catheter is placed near the juncture of the right subclavian artery and the right common carotid artery. Through the circuit flow of the heart-lung machine, the left carotid circuit is isolated. Upward flow is permitted in the carotid arteries allowing investigation of the small distal circuits of the brain.

While discussion is focused upon the isolation of certain arterial circuits for investigation or surgical intervention, the invention is useful in corresponding venous circuits. Similar procedures for access, egress and occlusion are followed, tailored to the circuit chosen.

Figure 4:
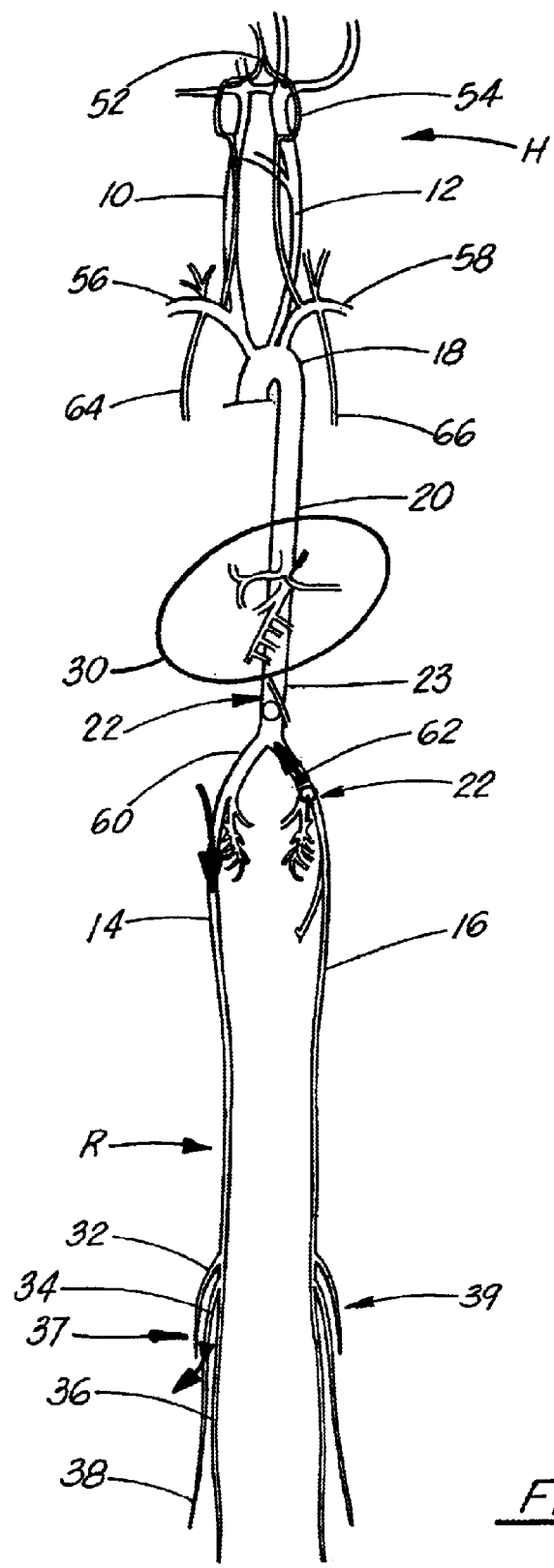
FIG. 4 is a schematic view of a leg circuit according to the inventive system.

FIG. 4 illustrates the occlusion, flow entry and egress and surgical access points for a leg circuit. Here, circulation is established via entry through the superficial femoral artery and egress through the posterior tibial artery and dorsalis pedus artery. This allows isolation and study of the leg circuitry.

There are several objectives in isolating the circuits. One is to optimize flow to emulate the in vivo performance. In the in vivo flow of blood in the live system, blood flow is in relatively high volume, and well contained within the particular systems (i.e., doesn't normally "leak" into extraneous cavities). It is difficult to achieve this in the post mortem situation because if a limited capacity to circulate the blood substitute and such as the capillary beds are absorptive of the blood and not able to return it through the venous system. Through the use of occluding devices such as the balloon catheters, the flow of fluid into unwanted circuits, cavities and capillaries may be controlled, thereby preserving the generated fluid flow to those circuits within the cadaver which are of immediate interest.

By reconstituting circulation through these different circuits, various medical devices and/or procedures utilizing such devices may be studied, developed, evaluated and tested. Performance of prototypes of devices being developed may be studied for the utility and efficacy of the device. Concurrently, the surgical procedure by which the device is implanted or utilized may be developed, and evaluated. The range of devices and procedures is extensive and will grow as the awareness of the invention and the extent of its utility. Currently, there is application for non-implantable and diagnostic devices such as guiding catheters, guide wires, therapeutic devices including those for temporary occlusion or reestablishment of circulation. Further, the ability to evaluate implantable stents, graphs, stent-graphs, occlusive materials including coils and cements and acrylics and to develop and train surgeons on the use of such devices in a setting very similar to that faced in vivo will enhance the professional development of surgeons and their teams.

During procedures performed on the cadaver, fluoroscopy can be used to visualize the flow through the specific circuit isolated. Likewise, ultrasound may be utilized to evaluate flow parameters and patterns of the chosen fluid. Such observation tools as fluoroscopy and ultrasound allows continual monitoring of the positioning of the surgical instrumentation, a device and the fluid flow as it is moved through the vascular system. A dye or other visual enhancer may be added to the fluid to aid in this visualization. In the case of a dye is conveniently red to simulate blood. Alternatives to the described fluid are heterogolus blood which imparts certain of the properties of blood, and fluids including micro particles or reflectors for sensing by ultrasound. A particular use of such a particle containing fluid is in the training, research and development of ultrasound equipment. Similar use may be made for other tracking instrumentation including angiography, angioscopy, computerized tomography and scintography, and magnetic resonance.

In some surgeries, a heater or a cooler or both may be included to simulate normal or various other body temperatures, or to enhance the performance of the fluid chosen for circulation.

EXAMPLE 1

Reconstitution of Abdominal Aorta Circulation

The lower thoracic, abdominal aorta and iliac arteries can be isolated for study. For work on this portion of the arterial tree and its major branches, which include the mesenteric and renal vessels, an arterial to arterial circulation is created (see FIGS. 2 and 3).

In order to begin to recreate circulation in these areas, the right 14 and left femoral 16 arteries are dissected and exposed. First, incisions 15 and 17 are made into the cadaver, indicated generally by the letter C, at the approximate location of the femoral arteries 14 and 16. These incisions 15 and 17 are then separated so that the physician or other worker can dissect down to the artery itself. These incisions 15 and 17 are made to ensure that there will be enough room to work on and around the femoral arteries 14 and 16 even after the placement of a cannula within the arteries 14 and 16. To keep excess fluid from leaking out of the system, the femoral arteries 14 and 16 can be tied off as they are being exposed and dissected.

In addition to exposing both the right 14 and left 16 femoral arteries, the right 10 and left 12 carotid arteries are also exposed in a similar manner. The appropriate incisions in the neck 11 and 13 are made by utilizing the standard anatomical landmarks, here at the location of the right 10 and left 12 carotid arteries. Only a small portion of the carotid arteries 10 and 12 need be dissected out as they are used, in this example, for flushing purposes only.

The purpose of the flushing process is to remove the thrombi and excess blood from the system, in order to reconstitute the function of the selected circuit, here the abdominal aorta. In this example, an MK1 Portaboy (not shown) was used. However, any device capable of pumping fluid into a system such as this can be used. The Portaboy is normally used for embalming. However, by replacing the embalming fluid with the described solution, the pump may be used to flush out the circuits of remaining fluid (including blood). In this example, a solution comprising 2 gallons of sterile water and 32 oz. of Permaco was used, but those skilled in the art recognize that alternatives may be used so long as it does not degrade the body tissue and materially affect its "live" character.

Incisions 11 and 13 are made in both the right 10 and left 12 carotid arteries and in both the right 14 and left 16 femoral arteries. These incisions 11 and 13 are made at approximately the same positions on opposite sides. The incisions are selected as a function of the examination; i.e., the device or modality to be examined. The benefit to be gained from the invention is to examine the surgical device or conduct the diagnosis or surgery in an environment simulating as closely as possible that in a live human. Therefore, the access to the selected circuit is set to provide the same theater, both as to location and the simulation of the hematological environment. It is to be remembered that the present invention may be used not only in the surgical context, but also in the hematological context, as by investigating such as the clotting effect of a device and the device's effect on blood flow. Thus, it is important to make sure that the incision within the arteries (or other vessels) are located such that there is still plenty of room to work on the vessel after, for example, a cannula (not shown) is in place.

Flushing is begun by placing the outflow tube of the Portaboy within the incision in one of the vessels and turning on the Portaboy. Fluid from the Portaboy is set to flow at pressure from about 20 to about 50 cm of water. It is unusual to use pressures higher than 50 cm on a Portaboy due to concern with causing damage to the circuit being flushed. Fluid passes from the Portaboy through the several circuits to the egress and is collected. It is usual to flush out all of the large arteries and veins. In this example, an outflow tube (not shown) is placed within the right carotid artery 10 first, allowing fluid to flow from the right carotid artery 10 and out through the incision 13 in the left carotid artery 12 as well as the incisions 15 and 17 of the right 14 and left 16 femoral arteries. Fluid flow is indicated generally by the arrows in the Figures. The fluid that is expelled from these vessels is suctioned off so that clots and fluid around the vessels does not pool and inhibit later examinations. The outflow tube from the Portaboy may also be placed within one of several of the other dissected vessels such as the incision 13 in the left carotid artery 12, the incision 15 in the right femoral artery 14 and the incision 17 in the left femoral artery 16 to ensure that all of the vessels are cleared of clots and excess blood.

In order to ensure that all of the flushing fluid and thrombi are cleaned out through specific vessels, one or more of the dissected vessels can be selectively occluded. For example, by placing the outflow tube from the Portaboy in the incision 15 in the right femoral artery 14 and occluding the left femoral artery 16, all of the flushing fluid from the Portaboy is forced out through the incisions 11 and 13 in the right 10 and left 12 carotid arteries. Similarly, by placing the outflow tube from the Portaboy into the incision 11 of the right carotid artery 10 and occluding the left carotid artery 12, flushing fluid is forced out through the incisions 15 and 17 of the right 14 and left 16 femoral arteries.

Flushing of the vessels continues until the fluid that is passing out through the vessels is clear. Clear fluid indicates that all of the clots and excess blood from the system have been removed. This is normally accomplished by one continuous flush.

At this point, an arteriogram can be done to ensure that the vessels are completely cleared out. Hypaque, a diatrizoate solution, or any other radiopaque medium can be perfused into the vessels to allow visualization during the radiography. By visually following the radiopaque medium through the vessels, the clearance of the vessels can be determined.

After the system is flushed out in this manner, the incisions 11 and 13 of the carotid arteries 10 and 12 are occluded, and the sternum (S) is opened up in order to cannulate the descending thoracic aorta 20. This is done in a manner similar to the dissection and cannulation of the carotid 10 and 12 and femoral 14 and 16 arteries. An incision 19 is made at the chest, spread open, and dissected down to the aorta 18. With the descending thoracic aorta 20 cannulated, the right 14 and left 16 femoral arteries cannulated, and the right 10 and left 12 carotid arteries occluded, the abdominal aorta 23 circulation is isolated.

A large bore balloon tipped catheter 50 such as the Meditek OB catheter available from Boston Scientific Co., mentioned previously, is positioned an incision 21 in the descending thoracic aorta 20 and the balloon 50 is expanded to occlude the artery 20 at this level. Any fluid may then be infused through this large bore catheter 50. Two outflow catheters (not shown) are placed in incisions 15 and 17 of the femoral arteries 14 and 16 and the circulation is established with inflow through the incision 21 in the thoracic aorta 20 and outflow through the incisions 15 and 17 in the femoral arteries 14 and 16 simulating normal human circulation. This allows work on the descending thoracic aorta 20, abdominal aorta 23, right 60 and left 62 iliac arteries, the common femorals and all their branches including the renal and visceral vessels (not shown).

As mentioned previously, variety of solutions may be used for the reconstitution of circulation, depending upon the particular examination to be performed, such as the device or the flow of the fluid. However, commonly used solutions include, but are not limited to ringer's lactate, Hespan, and saline. Likewise, traditional volume replicate solutions, radiographic, sonographic, centagaphic contrast media may be employed, as well as crystalloids and colloids to enhance the observation of properties to be examined. One reason for the use of ringer's lactate is that it is inexpensive. In addition, red dye can be added to simulate the appearance of blood.

While the same pump used for flushing the vessels, a separate pump might be employed if desired to reconstitute the circulation of fluid in the selected circuit. The pump will be operated intermittently or continuously depending upon the procedure and properties to be examined. For example, during fluoroscopy the pump will operate continuously so that flow can be visualized. In such example, a standard rotary head pump normally used during cardiopulmonary bypass for heart surgery is used. However, any pump that will achieve the same result can be used. The pump used in this example has a reservoir so that additional fluid or markers such as micro bubbles or reflectors may be added. A heater, a cooler, or both may be included in the circuit to simulate normal or other body temperature. This system allows adequate perfusion of the lower thoracic, and abdominal aorta and iliac arteries and its major branches for instrumentation and placement of such as angioplasty catheters, stents, and stented grafts.

EXAMPLE 2

Reconstitution of Carotid Artery Circulation

Figure 3:
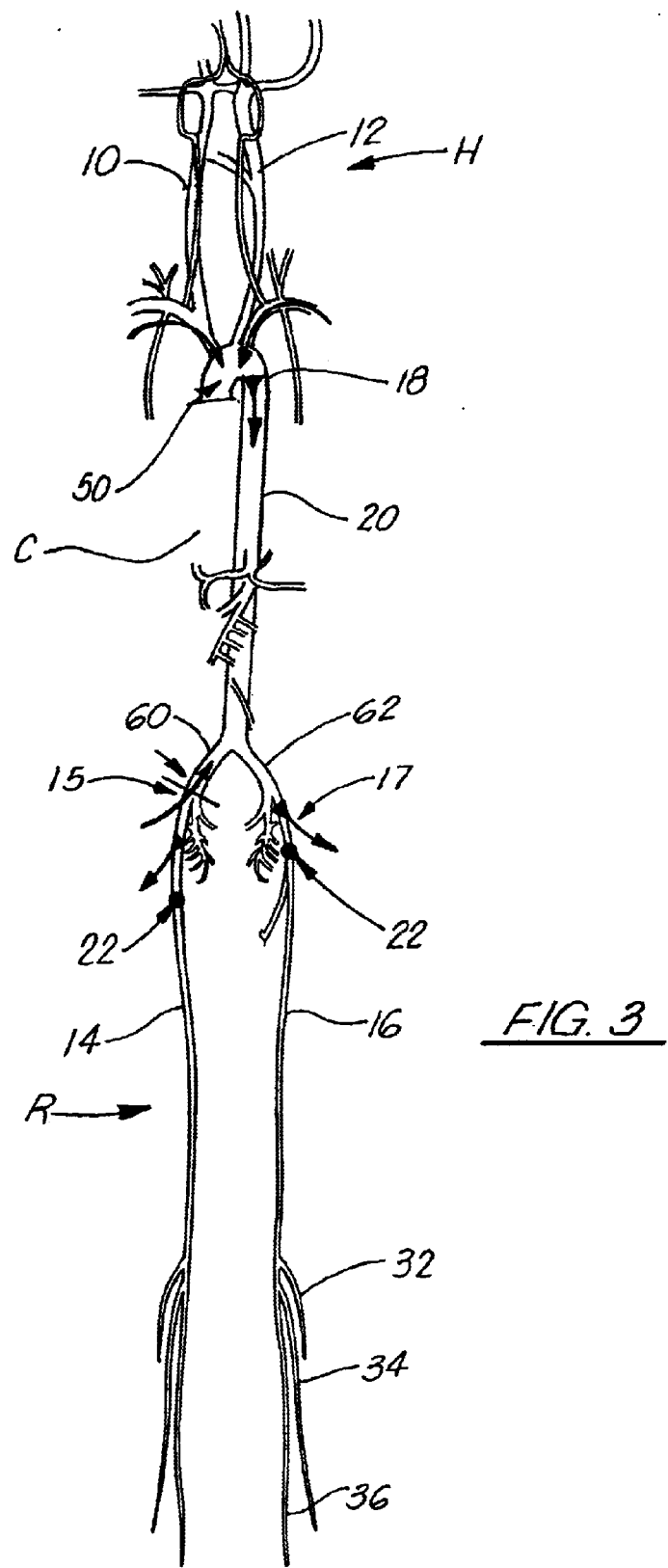
FIG. 3 is a schematic views of an abdominal aorta circuit according to the inventive system.

For reconstruction of blood circulation of the carotid arteries and intra cerebral vasculature, an alternative embodiment of the invention may be used as illustrated in FIGS. 2 and 3. In this embodiment, axillary arteries 64 and 66 and one carotid artery (10 or 12) are dissected and exposed. These vessels are then flushed out similarly to the procedure described in Example 1.

A large bore balloon tipped catheter 50 may then be placed in the incision 21 made in the descending thoracic aorta 20, as in Example 1 however, in this embodiment, it is directed toward the head, indicated generally as H. An outflow catheter (not shown) is placed in the incisions 65 and 67 made in both axillary arteries 64 and 66 and in the incision 11 or 13 of one carotid artery 10 or 12. Inflow of the selected perfusate, with such inclusions, markers and the like, is then established through the incision 21 of the thoracic aorta 20 with outflow, indicated generally by the arrows, through the incisions 65 and 67 made in axillary arteries 64 and 66 and the incision 11 or 13 of one carotid artery 10 or 12. Again, similar to Example 1, this generates a reconstruction of circulation in this circuit simulating normal blood flow in the human. Catheters (not shown) may be passed through the incisions 11 or 13 of the carotid arteries 10 or 12 or the incisions 65 and 67 in the axillary arteries 64 or 66 for instrumentation of the extra cranial and intra cranial vasculature for similar purposes of testing and training. Upward flow in a carotid artery permits antegrade net flow in the small, distal vessels of the brain. Cranial flow is less structured than such as the intercostal cavity in that flow is supplied to the brain through chosen arteries and allowed to flow generally through the brain. Thus, there is no formal point of egress for the fluid.

EXAMPLE 3

Reconstitution of Leg or Arm Circulation

An alternative method of the instant invention may be used in reconstruction of circulation in an arm or a leg (see, FIG. 4). For example, by establishing inflow through the femoral artery 14 and outflow through the distal tibial vessels 32, 34 and 36, the inventive reconstructed circulation system creates a model to allow instrumentation of the lower extremity vessels for the development and evaluation of devices, diagnostic or surgical techniques.

To reconstitute circulation in the right leg, for example, the posterior tibial artery 36 and dorsalis pedus artery 38 are exposed, dissected, and flushed out in a manner similar to exposure and flushing of the femoral 14 and 16 or carotid 10 and 12 arteries. Once these arteries are cleared of clots and excess fluid, reconstruction of circulation through the right leg R and its associated vessels may be initiated. In the practice of the invention, inflow of the selected perfusate is established through an incision 69 in the superficial femoral artery 68 and outflow through incisions 37 and 39 in the posterior tibial artery 36 and the dorsalis pedus artery 38, respectively. As with the other embodiments described above, the natural opacity of the vessels obscures flow of the fluid in the arteries in the leg necessitating the use of such as fluoroscopy or ultrasound for visualization of each of the vessels and their associated branches and movement of devices and instruments during examination.

Similarly, inflow can be established through the axillary artery 64 or 66 with outflow through the radial and ulnar arteries (not shown) to allow instrumentation of the upper extremity vessels.

The following table lists the body elements and descriptions as used herein and in the drawings attached hereto:

ELEMENTS LIST

| Number | Description |
| --- | --- |
| C | Cadaver |
| S | Sternum |
| 10 | right carotid artery |
| 11 | Incision in the right carotid artery |
| 12 | Left carotid artery |
| 13 | Incision in the left carotid artery |
| 14 | Right femoral artery |
| 15 | Incision in the right femoral artery |
| 16 | Left femoral artery |
| 17 | Incision in the left femoral artery |
| 18 | Aorta |
| 19 | Incision in the sternum/chest |
| 20 | Descending thoracic aorta |
| 21 | Incision in the descending thoracic aorta |
| 22 | Occlusion points |
| 23 | Abdominal aorta |
| 30 | Gut |
| 32 | Anterior tibial artery |
| 34 | Peroneal artery |
| 36 | Posterior tibial artery |
| 37 | Incision in the posterior tibial artery |
| 38 | Pedus dorsalis |
| 39 | Incision in the pedus dorsalis |
| 40 | Visceral branches |
| 50 | Balloon catheter |
| 52 | Anterior communicating artery |
| 54 | Posterior communicating artery |
| 56 | Right subclavian artery |
| 58 | Left subclavian artery |
| 60 | Right iliac artery |
| 62 | Left iliac artery |
| 64 | Right axillary artery |
| 65 | Incision in the right axillary artery |
| 66 | Left axillary artery |
| 67 | Incision in the left axillary artery |
| 68 | Superficial femoral artery |

The foregoing disclosure and description of the invention are illustrative and explanatory thereof, and various changes in the details of the illustrated apparatus and construction and method of operation may be made without departing from the spirit of the invention.

What is claimed is:

1. A method of selectively perfusing a specific tree in the circulatory system of a non-preserved, non-heart beating cadaver with a perfusate to maintain selective circulation in said specific tree in the circulatory system of said cadaver comprising the steps of:

exposing at least two arteries of an arterial tree;

making an incision in said at least two arteries of said arterial tree wherein said tree includes a circulatory circuit of a leg circuit;

perfusing a first purging solution through said incisions of said at least two arteries to clear said arterial tree of arterial thrombi;

establishing a point of access to said arterial tree with a catheter having a selectively openable lumen; said catheter being capable of occluding an artery but still allowing access to said artery through said selectively openable lumen;

establishing at least one point of egress from said arterial tree, said access and said egress establishing the limits of a circulatory circuit to be studied; and perfusing a second solution through said arterial tree through said point of access.

2. The method of claim 1, further including a pump, said pump circulating said second solution through said arterial tree by receiving said second solution from said cadaver and returning said second solution to said cadaver so as to develop said second solution flow through said arterial tree of said cadaver.

3. The method of claim 1, wherein said at least two arteries is 4 arteries.

4. The method of claim 1, wherein said at least one point of egress is two points of egress.

5. The method of claim 4, wherein said two points of egress are the right femoral artery and the left femoral artery.

6. The method of claim 5, wherein said four arteries are the left carotid artery, the right carotid artery, the left femoral artery and the right femoral artery.

7. The method of claim 6, wherein said point of access is a thoracic aorta.

8. The method of claim 1, wherein said at least two arteries are three arteries.

9. The method of claim 8, wherein said three arteries are the superficial femoral artery, the posterior tibial artery and the dorsalis pedis artery.

10. The method of claim 9, wherein said point of access is the superficial femoral artery.

11. The method of claim 1, wherein said at least one point of egress is two points of egress.

12. The method of claim 11, wherein said two points of egress are the posterior tibial artery and the dorsalis pedis artery.

13. The method of claim 1, wherein said circulatory circuit is an arm circuit.

14. The method of claim 1, further including a heater to establish a specific body temperature.

15. The method of claim 1, further including a cooler to establish a specific body temperature.

16. A method of selectively perfusing a branch of a blood vessel tree of a non-preserved, non-heart beating cadaver with a perfusate to maintain selective circulation in a specific circulatory system of said cadaver wherein said branch is one of the central thoracic system, an extremity, the intercostal cavity, the coronary vessels and the carotid vessels comprising the steps of:

exposing at least two vessels comprising a branch of a blood vessel tree;

making an incision in said at least two vessels of said branch;

perfusing a first purging solution through said incisions of said at least two vessels to clear said branch of thrombi;

establishing a point of access to said branch with a catheter having a selectively openable lumen; said catheter being capable of occluding a vessel but still allowing access to said vessel through said selectively openable lumen;

establishing at least one point of egress from said branch, said access and said egress establishing the limits of a circulatory circuit to be studied; and perfusing a second solution through said branch through said point of access.

17. The method of claim 16, further including a pump, said pump circulating said second solution through said branch by receiving said second solution from said cadaver and returning said second solution to said cadaver so as to develop said second solution flow through said branch of said cadaver.

18. The method of claim 16, wherein said branch to be studied is an arterial branch of said tree.

19. The method of claim 16, wherein said branch is a venous branch of said tree.

20. The method of claim 16, wherein said vessels are one of the axial, brachial, iliac, femoral, popliteal and pulmonary vessels.

* * * * *